United States Patent
Kauri et al.

(10) Patent No.: US 9,409,697 B2
(45) Date of Patent: Aug. 9, 2016

(54) POLYMER-COATED OVEN BOARD AND FOOD PACKAGE MADE FROM IT

(75) Inventors: Tommi Kauri, Huutjärvi (FI); Tapani Penttinen, Huutjärvi (FI); Kimmo Nevalainen, Kotka (FI)

(73) Assignee: STORA ENSO OYJ, Helsinki (FI)

( * ) Notice: Subject to any disclaimer, the term of this patent is extended or adjusted under 35 U.S.C. 154(b) by 974 days.

(21) Appl. No.: 12/526,876

(22) PCT Filed: Dec. 19, 2008

(86) PCT No.: PCT/FI2008/050771
§ 371 (c)(1),
(2), (4) Date: Nov. 25, 2009

(87) PCT Pub. No.: WO2009/080891
PCT Pub. Date: Jul. 2, 2009

(65) Prior Publication Data
US 2013/0193026 A1    Aug. 1, 2013

(30) Foreign Application Priority Data
Dec. 20, 2007  (FI) .................................... 20071004

(51) Int. Cl.
*H05B 6/80*   (2006.01)
*B32B 27/06*  (2006.01)
*B65D 81/34*  (2006.01)
(Continued)

(52) U.S. Cl.
CPC ............. *B65D 81/343* (2013.01); *B32B 1/02* (2013.01); *B32B 3/04* (2013.01); *B32B 27/08* (2013.01);
(Continued)

(58) Field of Classification Search
CPC ............. B65D 2581/3494; B65D 2581/3472; B65D 81/3453; B65D 81/3446; B65D 81/3466; B32B 2307/7244; B32B 2307/7246; B32B 2435/02; B32B 2439/40; B32B 2439/70
USPC .................. 219/730, 728, 725; 229/404, 5.84, 229/123.2, 123.1, 5.5, 102; 426/127, 106; 428/36.7, 34.2, 35.4, 36.6, 448, 474.4; 427/487, 387, 391, 393.4; 206/536
See application file for complete search history.

(56) References Cited

U.S. PATENT DOCUMENTS 6,436,547 B1 * 8/2002 Toft et al. .................. 428/474.4
6,534,139 B1   3/2003 Gibbons et al.
(Continued)

FOREIGN PATENT DOCUMENTS

EP    1541334 A1 * 6/2005
EP    1 640 157 A1  3/2006
(Continued)

*Primary Examiner* — Quang Van
(74) *Attorney, Agent, or Firm* — Birch, Stewart, Kolasch & Birch, LLP

(57) ABSTRACT

A polymer-coated oven board includes a coating that contains an oxygen barrier layer of polyamide (PA) and a surface layer of polyethylene terephthalate (PET) adhered to the oxygen barrier layer. These layers are produced onto the board by co-extrusion without a binding agent layer between them. The weight of the PA oxygen barrier layer is 3-15 g/m$^2$, and the weight of the PET surface layer is 20-50 g/m$^2$. An oxygen impermeable food package heatable in an oven includes the oven board wherein the superimposed polyamide and PET layers are located inside the board layer in the package. The oven board may also include a PET surface layer on the opposite side of the board. Polyamide has been selected so that it withstands heat sealing and the heating of the package in an oven.

6 Claims, 1 Drawing Sheet

(51) Int. Cl.
*B32B 27/10* (2006.01)
*B32B 27/34* (2006.01)
*B32B 27/36* (2006.01)
*B65D 77/20* (2006.01)
*B32B 27/08* (2006.01)
*B32B 1/02* (2006.01)
*B32B 3/04* (2006.01)

(52) U.S. Cl.
CPC ............... *B32B 27/10* (2013.01); *B32B 27/34* (2013.01); *B32B 27/36* (2013.01); *B65D 77/2024* (2013.01); *B65D 81/3453* (2013.01); *B32B 2307/31* (2013.01); *B32B 2307/718* (2013.01); *B32B 2307/7244* (2013.01); *B32B 2307/7246* (2013.01); *B32B 2435/02* (2013.01); *B32B 2439/40* (2013.01); *B32B 2439/70* (2013.01); *Y10T 428/24942* (2015.01)

(56) References Cited

U.S. PATENT DOCUMENTS

| | | | |
|---|---|---|---|
| 2003/0059591 A1* | 3/2003 | Penttinen | B32B 27/10 428/212 |
| 2004/0099565 A1* | 5/2004 | Dehlin et al. | 206/536 |
| 2004/0245138 A1* | 12/2004 | Penttinen et al. | 206/484.1 |
| 2006/0105130 A1 | 5/2006 | Brown | |
| 2007/0181659 A1* | 8/2007 | Rasanen et al. | 229/404 |

FOREIGN PATENT DOCUMENTS

| | | | |
|---|---|---|---|
| JP | 2000-108282 A | | 4/2000 |
| WO | WO 9201558 A1 | * | 2/1992 |
| WO | WO-03/033258 A1 | | 4/2003 |

* cited by examiner

POLYMER-COATED OVEN BOARD AND FOOD PACKAGE MADE FROM IT

The invention relates to a polymer-coated oven board and oven heatable closed oxygen impermeable food package, for which board of the invention has been used.

A closed food package, such as a processed food package is required to be vapour and gas impermeable in order to achieve sufficient preservability of the product i.e. shelf life during the product's transport and storage and in retail store. In addition, the properties of the package may include that the product can be heated in a range or microwave oven without having to open the package. To meet these requirements, the board used for the package is coated at least from one side, preferably from both sides, with one or several polymer layers so that the different layers perform different functions in the board and the finished package.

Vapour and oxygen impermeable packing boards typically comprise a polymer coating with two or several layers, the topmost layer, which usually becomes the inner surface of the package, being a heat seal layer making possible the closing of the package by seaming, and a layer below it forming an oxygen impermeable barrier layer. Also the outer surface of the package generally has a heat seal layer so that the package can be closed by seaming the heat seal layers to each other.

On the other hand, it is demanded of the heatable oven board to be used for packages that its polymer coating withstands the heating of the product in an oven. Because of this, polyethylene terephtalate (PET) has been preferred as coating polymer in oven boards, its melting point being approximately 250° C., i.e. above the typical heating temperatures of approximately 200-240 ° C. of range ovens. Nevertheless, the oxygen barrier properties of PET are poor, and thus it does not suffice as polymer coating for processed food packages, of which a long shelf life is required in stores.

The US patent specification 6534139 B1 discloses a packaging board, which comprises an inner layer of ethylene vinyl alcohol copolymer (EVOH) functioning as oxygen barrier and a surface layer of polyethylene terephtalate (PET). However, EVOH melts in approximately 180-190 ° C. i.e. below the normal heating temperatures for ovens, which makes it poorly applicable as oven board. The publication does not either demonstrate a board coated with EVOH/PET as oven board, but, in addition to oxygen barrier, it justifies the selection of coating polymers with the packaging material's mechanical properties and recyclability.

The problem with EVOH in connection with PET is still that in the high heat sealing temperature required by PET, EVOH is in the molten state so that the water vapour released as bubbles from the board layer by heating can penetrate it and break the oxygen barrier it forms. Before melting, PET begins to soften at approximately 180 as bubbles C, and in this softened state, PET layers can be adhered to each other by heat sealing. These sealing temperatures are at the melting point for EVOH or above this.

The application specification EP 1640157 A1 discloses a heat resistant packaging board, the polymer coating of which contains polyester comprising a cyclic acetal structure instead of PET. The use of this material in the surface layer of coated-board has been justified by the poor heat sealibility of PET. The board may comprise a multilayer coating, in which there is provided, in addition to the heat sealing layer of acetal-based polyester, e.g. an oxygen barrier layer, with polyamides mentioned as one possible material. According to Example 4 in the publication, when using polyamide, however, an adhesive layer is required, binding together the said polyamide and a surface layer of polyester.

The purpose of the invention is to produce an oven board, which is simpler than before and applicable to food packages, and which has the oxygen impermeability required by the preservation of the product and which endures the heating of the package in an oven or microwave oven without suffering any damage. According to the invention, the solution is a polymer-coated oven board, which contains an oxygen barrier layer of polyamide (PA) and a surface layer of polyethylene terephtalate (PET) adhered to it, the layers having been produced onto the board by coextrusion without an adhesive layer between them so that the weight of the PA oxygen barrier layer is 3-15 $g/m^2$ and the weight of the PET surface layer is 20-50 $g/m^2$.

The simplest embodiment of the invention is a two-layer coating on board, consisting of a polyamide layer adhered directly to the board and a PET layer adhered to it, the latter forming the surface layer for the oven board, which is most preferably the inner surface in the closed package. The PA and PET layers can be applied onto board by coextrusion, and a PET layer can be extruded onto the opposite side of the board, forming the outer surface in the package. In this case the package can be closed by sealing the PET layers on opposite sides of the board to each other.

The invention is based on the adhesion of extruded polyamide and PET layers to each other so that they do not require a separate adhesive layer to be installed between them, better resistance of the polyamide functioning as oxygen barrier than EVOH, and better resistance against water vapour that is released from the board in heat sealing.

An especially advantageous oxygen barrier polymer for the oven board and food package according to the invention is high-barrier polyamide (HBPA), such as the commercial product Grivory HB 5299. As oxygen barrier, HBPA is a decidedly better polymer than PET, and it approaches the low oxygen penetration values that can be achieved with an intact EVOH layer.

The oven heatable food package according to the invention is characterised in that it comprises the above described oven board of the invention so that the superimposed polyamide and PET layers are located inside the board layer in a closed package.

The invention will next be described in more detail by means of examples included in the enclosed patent drawings. The examples comprise two state-of-the-art board layer structures and two embodiments of the oven board according to the invention. In the drawings FIG. 1 illustrates a state-of-the-art packaging board;

Figure 1:
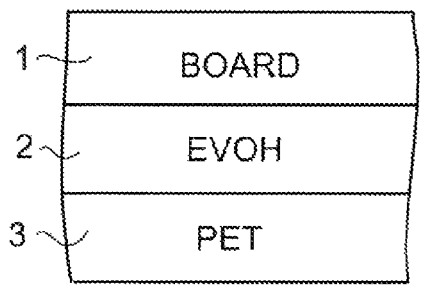
Figure 2:
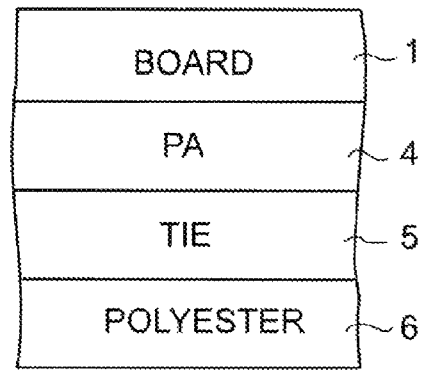
FIG. 2 illustrates a second state-of-the-art packaging board, which is intended for a heatable package.

In FIG. 1 there is shown a layer-structured packaging board, the structure of which corresponds to the one disclosed in FIG. 1 of the publication U.S. Pat. No. 6,534,139 B1. Here superimposed EVOH (2) and PET (3) layers have been co-extruded onto the board 1. There can also be a PET layer on the opposite side of the board, which structure is shown in FIG. 2 of the publication U.S. Pat. No. 6,534,139 B 1. If in these structures PET is resistant to heating in an oven, its heat sealing requires so high temperatures that the EVOH oxygen barrier layer (2) melts so that it can absorb water vapour released from the board due to heating and lose its integrity. EVOH would further melt during heating in an oven, and this would thus impair the structure's integrity. For these reasons, the structure in FIG. 1 is not suited for heatable oven boards.

The layer structure of the packing board according to FIG. 2 is apparent from Example 4 of the publication EP 1640157 A1. Here a polyamide layer 4, a binding agent layer 5 and a polyester layer 6 have been extruded on the board 1. Polyester 6 consists of diol unit containing a cyclical acetal group and dicarboxylic acid units, and its use has been justified by that it is more easily heat sealable than PET. According to the publication, however, the heat sealing layer 6 can be PET blended to said acetal-based polyester.

Figure 3:
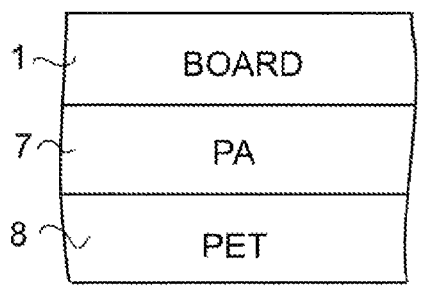
FIG. 3 illustrates the layer structure of an oven board according to the invention.

FIG. 3 illustrates the simplest oven board of the invention, in which polyamide and PET layers 7, 8 have been co extruded to the board 1. The polyamide layer 7 is adhered directly to the board 1, and the polyamide and PET layers 7, 8 are adhered to each other without a binding agent between them. The polyamide layer 7 is most preferably high-barrier polyamide (HBPA), and the PET layer 8 can be commercial polyethylene terephtalate as such, without doped additives or other components. The board 1 can be packing board intended for cups or forms, with a weight of 170-600 $g/m^2$, preferably 200-400 $g/m^2$. The weight of the polyamide layer 7 can be between 3-15 $g/m^2$, preferably 5-10 $g/m^2$, and the weight of the PET layer 8 can be 20-50 $g/m^2$, preferably 30-40 $g/m^2$.

Figure 4:
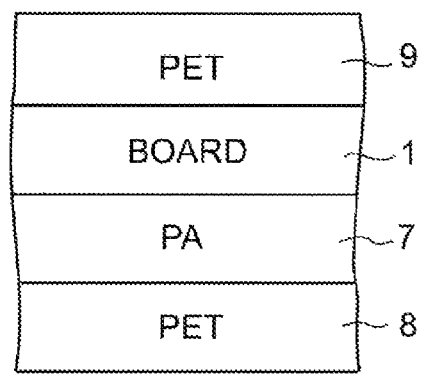
FIG. 4 illustrates the layer structure of a second oven board according to the invention.

The oven board according to FIG. 4 differs from the one shown in FIG. 3 only in that also the opposite side of the board is provided with an extruded PET layer 9, which can be similar to the layer 8, i.e. with a weight of 20-50 $g/m^2$, preferably 30-40 $g/m^2$.

Figure 5:
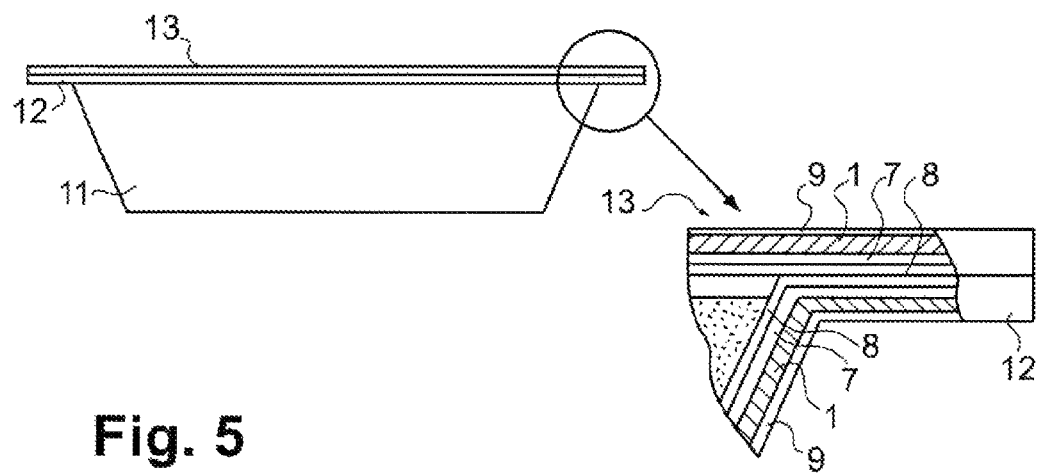
FIG. 5 illustrates a closed package according to the invention.

In FIG. 5 there is shown an oven heatable food package of the invention, which is formed of the oven board according to FIG. 4 described above. The package is a processed food form sealed by heat sealing, in which the form 11 and the cover 13 seamed to the edge collar 12 at the mouth of the form are made of the same oven board. The cover can also be some other oxygen impermeable, heat-resistant material. The superimposed polyamide and PET layers 7, 8 of the oven board are located on the inner surface of the board in a closed package, and the second PET layer 9 is provided on the outer surface of the package. The heat seal consists of opposite PET layers 8 adhered to each other in the area of the edge collar 12. It is also possible that the whole package be formed from the oven board of the invention by bending and heat sealing. The preferable heat sealing temperature is 180-220 ° C.; within this range, the PET layer becomes soft and changes to be adherent, but polyamide, especially HBPA, does not yet melt.

EXAMPLE

A packing board was manufactured by extrusion coating three test materials, from which the penetration of oxygen and water vapour was measured in different temperatures and relative humidities. Material 1, which represented the state of the art, was Trayforma form cardboard, with a weight of 350 $g/m^2$ and an extruded PET layer, the weight of which was 40 $g/m^2$. Material 2, which represented the invention, was cup board Cupforma 210, with a weight of 210 $g/m^2$, an inner layer of HB polyamide Grivory BH 5299, with a weight of 8 $g/m^2$, and an outer layer of PET, with a weight of 32 $g/m^2$. Material 3, which was reference material, was the said cup board Cupforma 210, with an innermost EVOH layer of 6 $g/m^2$, on top of that a layer of the said HB polyamide of 7 $g/m^2$, and an outermost PET layer of 30 $g/m^2$. The results for oxygen penetration are shown in the enclosed Table 1 and the results for water vapour penetration in the enclosed Table 2.

The penetration values are given as cubic centimeter per square meter and 24 hours in the Table ($cm^3/m^2$-24 hours).

TABLE 1

| | penetration of oxygen | | |
|---|---|---|---|
| Material | $O_2TR$ (10° C., 60% RH) | $O_2TR$ (23° C., 60% RH) | $O_2TR$ (38° C., 85% RH) |
| 1 | 36 | 61 | 128 |
|   | 39 | 64 | 131 |
| 2 |    | 7.0 | 74 |
|   |    | 7.5 | 66 |
| 3 |    | 2.8 | 53 |
|   |    | 2.4 | 42 |

TABLE 2

| | penetration of water vapour | | |
|---|---|---|---|
| Material | WVTR (10° C., 50% RH) | WVTR (23° C., 50% RH) | WVTR (38° C., 85% RH) |
| 1 | 4.6 | 10 | 44 |
|   | 4.8 | 10 | 46 |
| 2 | 4.7 | 11 | 69 |
|   | 4.0 | 11 | 70 |
| 3 | 1.6 | 5 | 65 |
|   |     | 5 | 75 |

The tests showed that the HBPA and PET layers can be brought onto the board as a co-extruded two-layer structure without any need for binding agent layers between them. In addition, according to the results the structure of the invention, board /HBPA/PET (material 2) forms an essentially better oxygen barrier than mere PET layer on the board (material 1), especially when stored in room temperature or cooler. Adding the EVOH layer to the structure (material 3) improves the oxygen barrier further, but the EVOH layer may get moist and the oxygen barrier weaken when heat-sealing this material to packages.

Measuring results for the penetration of water vapour show that the structure of the invention, board/HBPA/PET and the known structure board/PET are substantially equal in room temperature and below that in relation to water vapour barrier. EVOH improves the water vapour barrier, but as it was mentioned, this benefit may be lost when heat-sealing the material.

The invention claimed is:

1. A polymer-coated oven board comprising a coextruded coating, wherein said coextruded coating consists of both
 (i) an oxygen barrier layer consisting of polyamide (PA) directly adhered to said oven board and
 (ii) a surface layer of polyethylene terephthalate (PET) directly adhered to the oxygen barrier layer, without a binding agent layer between said PA oxygen barrier layer and said PET surface layer,
 wherein the weight of the PA oxygen barrier layer is 3-15 $g/m^2$ and the weight of the PET surface layer is 20-50 $g/m^2$.

2. The oven board according to claim 1, further comprising a PET surface layer on the opposite side of the board.

3. The oven board according to claim 1, wherein the oxygen barrier layer is made of high-barrier polyamide (HBPA).

4. The oven board according to claim 1, wherein the weight of the polyamide layer is 5-10 $g/m^2$.

5. The oven board according to claim 1, wherein the weight of the PET layer against the polyamide layer is 30-40 $g/m^2$.

6. An oxygen impermeable food package heatable in an oven, comprising the oven board according to claim 1 wherein the superimposed polyamide and PET layers are located inside the board layer in the package.

* * * * *